United States Patent
Hung et al.

(10) Patent No.: US 7,740,496 B2
(45) Date of Patent: Jun. 22, 2010

(54) HINGE STRUCTURE WITH ELECTRICAL CONNECTOR

(75) Inventors: Yi-Hsun Hung, Taipei (TW); Pao-Lung Wang, Taipei (TW); Ping-Huang Kuo, Taipei (TW)

(73) Assignee: Inventec Corporat, Taipei (TW)

( * ) Notice: Subject to any disclaimer, the term of this patent is extended or adjusted under 35 U.S.C. 154(b) by 0 days.

(21) Appl. No.: 12/396,709

(22) Filed: Mar. 3, 2009

(65) Prior Publication Data

US 2010/0093188 A1    Apr. 15, 2010

(30) Foreign Application Priority Data

Oct. 15, 2008    (TW) .............................. 97139589 A

(51) Int. Cl.
*H01R 3/00*    (2006.01)
(52) U.S. Cl. ........................................ 439/164; 439/31
(58) Field of Classification Search ................. 439/164, 439/31
See application file for complete search history.

(56) References Cited

U.S. PATENT DOCUMENTS

| 5,498,165 A * | 3/1996 | Tseng ........................... 439/31 |
| 5,608,604 A * | 3/1997 | Francis ................... 361/679.28 |
| 5,617,301 A * | 4/1997 | Sato et al. .................... 361/796 |
| 6,373,689 B1 * | 4/2002 | Yim ...................... 361/679.29 |
| 6,530,784 B1 * | 3/2003 | Yim et al. ..................... 439/31 |
| 6,857,879 B2 * | 2/2005 | Sawada et al. ................ 439/31 |
| 7,121,876 B2 * | 10/2006 | Chien ......................... 439/500 |
| 7,448,898 B2 * | 11/2008 | Tae et al. .................... 439/367 |
| 7,534,120 B2 * | 5/2009 | Yada et al. .................. 439/164 |

\* cited by examiner

*Primary Examiner*—Truc T Nguyen
(74) *Attorney, Agent, or Firm*—Morris, Manning & Martin LLP; Tim Tingkang Xia

(57) ABSTRACT

A hinge structure with an electrical connector is connected to a first body of an electronic device through a support frame. A pivot portion of the hinge structure is connected to a second body of the electronic device and includes a rotating shaft connected to the support frame, such that the first body is capable of rotating relative to the second body. The electrical connector is a power input connector disposed on the support frame, such that a power line is inserted in the power input connector to electrically connect to the electronic device.

19 Claims, 4 Drawing Sheets

HINGE STRUCTURE WITH ELECTRICAL CONNECTOR

CROSS-REFERENCE TO RELATED APPLICATIONS

This non-provisional application claims priority under 35 U.S.C. §119(a) on Patent Application No(s). 097139589 filed in Taiwan, R.O.C. on Oct. 15, 2008 the entire contents of which are hereby incorporated by reference.

BACKGROUND OF THE INVENTION

1. Field of the Invention

The present invention relates to a hinge structure, and more particularly to a hinge structure with an electrical connector applied to an electronic device.

2. Related Art

With the progress of electronic technology, various portable electronic devices such as notebook computers, electronic dictionaries, and clamshell phones have become indispensable in people's work and daily life. Such an electronic product generally includes a display and a main body, and a hinge structure pivoted to the display and the main body serves as a rotating axle center between the display and the main body, such that the display and the main body are connected and rotate relative to each other through the hinge structure.

Currently, in order to make the portable electronic devices to be easily carried along and prevent the devices from being interrupted in operation due to power loss, most portable electronic devices employ the power supply mode of setting a power connector within the main body of each device and configuring a power jack exposed out of the surface of the main body for connecting to the power line.

However, recently, as the power connector (DC-in) of the portable electronic device is disposed within the main body, the power jack exposed out of the surface of the main body is located on two sides or at the back of the main body of the electronic device. Taking the notebook computer for example, when a user intends to insert the power plug into the power connector, the position of the power jack has to be found first so as to insert the power line in the notebook computer. Besides, the only way for the user to figure out whether the power line is successfully plugged or pulled is from the window of the operating system of the computer.

SUMMARY OF THE INVENTION

Accordingly, the present invention is directed to a hinge structure with an electrical connector, which is suitable for solving the problem in a conventional portable electronic device that the power jack of the power connector is mounted on two sides of the main body or at the back of the main body, such that it is inconvenient for the user to insert a power line to the portable electronic device in real time.

A hinge structure with an electrical connector is provided in the present invention, which is adapted to connect a first body to a second body of an electronic device, such that the first body is capable of rotating relative to the second body. Meanwhile, the electrical connector is a power input connector, in which a power line is inserted in the electrical connector to electrically connect to the electronic device. The hinge structure of the present invention includes a pivot portion, a support frame, and a fixed seat. The pivot portion is disposed on the second body, and has a rotating shaft. The support frame has an upright section and a holding section. The upright section is disposed on the first body, and the holding section is connected to the rotating shaft of the pivot portion, so as to rotate relative to the second body through the rotating shaft. The fixed seat is disposed on the other side of the holding section opposite to the pivot portion, and has an accommodation space for accommodating the power input connector.

As described above, the hinge structure with an electrical connector of the present invention is adapted to connect a first body to a second body of an electronic device, so that the first body is capable of rotating relative to the second body. Meanwhile, the electrical connector of the notebook computer is disposed on the hinge structure, such that the user can conveniently insert a power line into the notebook computer without wasting time in searching for the position of the electrical connector on the notebook computer. Therefore, it is quite convenient in operation.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

In the present invention, an electronic device refers to, for example but not limited to, an electronic device having a display connected to its main body through a hinge structure, such as a notebook computer, a tablet computer, an ultra mobile personal computer (UMPC), or an electronic dictionary (or called translator). The notebook computer is taken as an example for illustrations below, and the accompanying drawings are provided for reference only, instead of limiting the present invention.

Figure 1A:
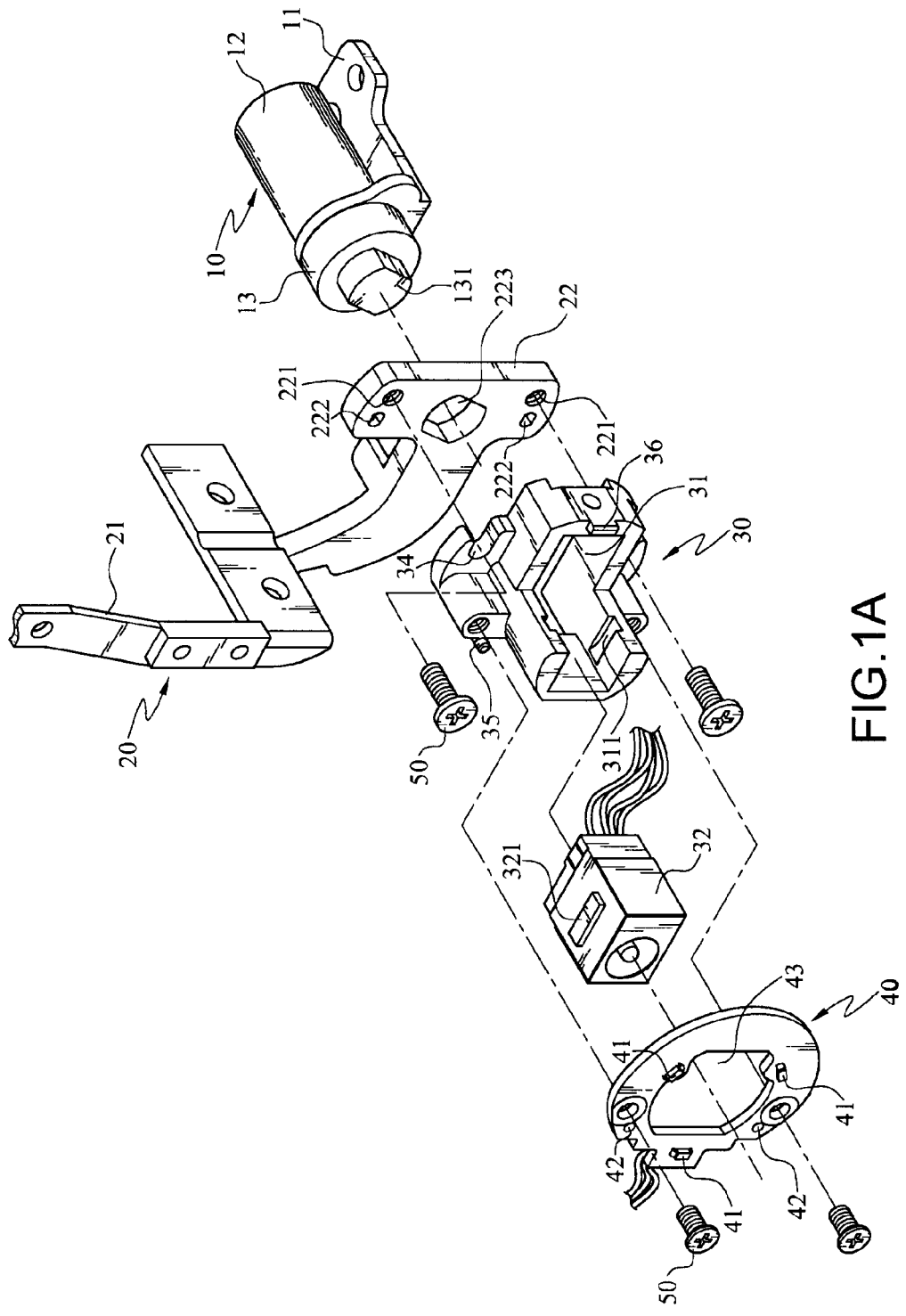
FIG. 1A is a schematic three-dimensional exploded view of an embodiment of the present invention.
Figure 2:
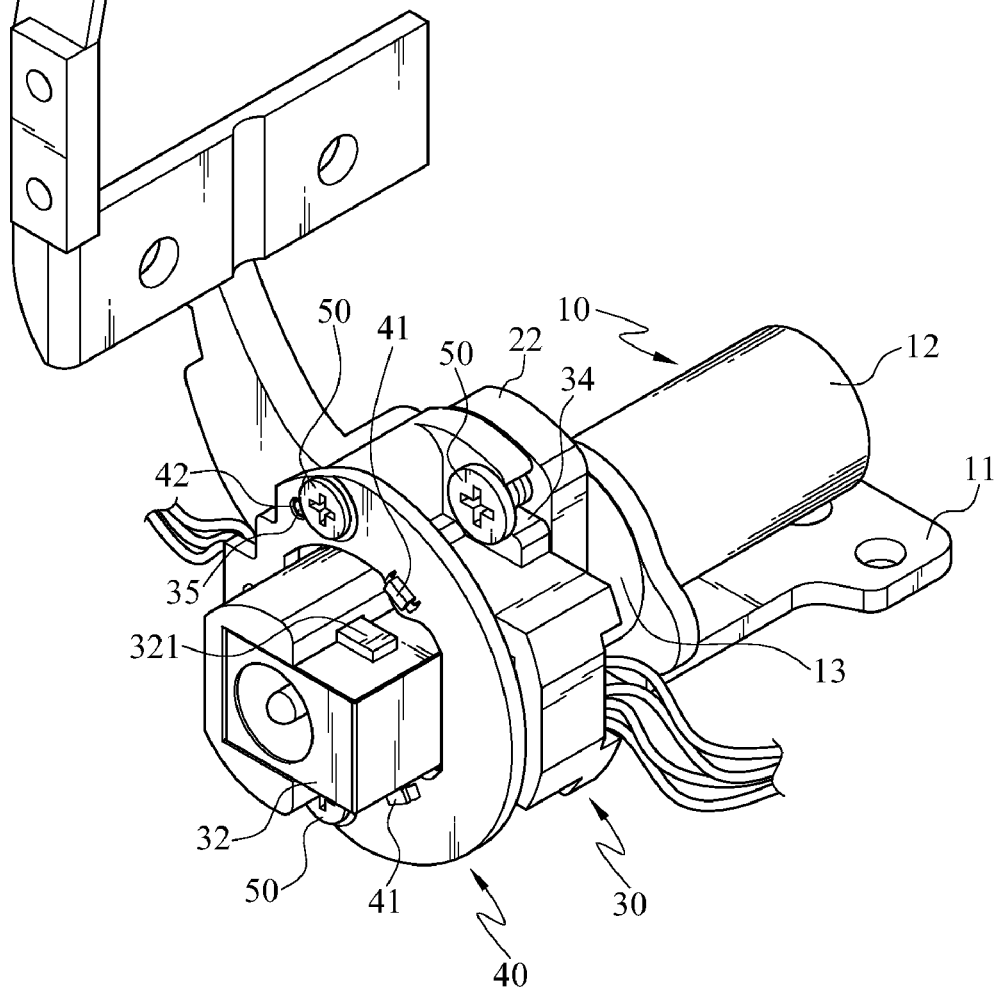
FIG. 2 is a schematic three-dimensional combined view of an embodiment of the present invention.

FIGS. 1A and 2 are schematic three-dimensional views of the present invention. According to the present invention, a hinge structure with an electrical connector includes a pivot portion 10, a support frame 20, a fixed seat 30, and a circuit board 40. The pivot portion 10 has a connecting piece 11, a shaft tube 12, and a rotating shaft 13. The connecting piece 11 is connected to the shaft tube 12. One end of the rotating shaft 13 rotationally penetrates through the shaft tube 12, and the other end is provided with a retaining portion 131 protruding out of the shaft tube 12. The support frame 20 has an upright section 21 and a holding section 22. One end of the holding section 22 is connected to the upright section 21, and the other end is provided with two threaded holes 221, two through-holes 222, and an opening 223. The two threaded holes 221 are respectively disposed on two sides of the opening 223, and the two through-holes 222 are also respectively disposed on two sides of the opening 223 and are respectively adjacent to the respective threaded hole 221. The shape of the opening 223 is matched with that of the retaining portion 131 on the rotating shaft 13. Thus, by fitting and clipping the opening 223 on the retaining portion 131, the support frame 20 is able to rotate relative to the pivot portion 10 through the rotating shaft 13.

Figure 1B:
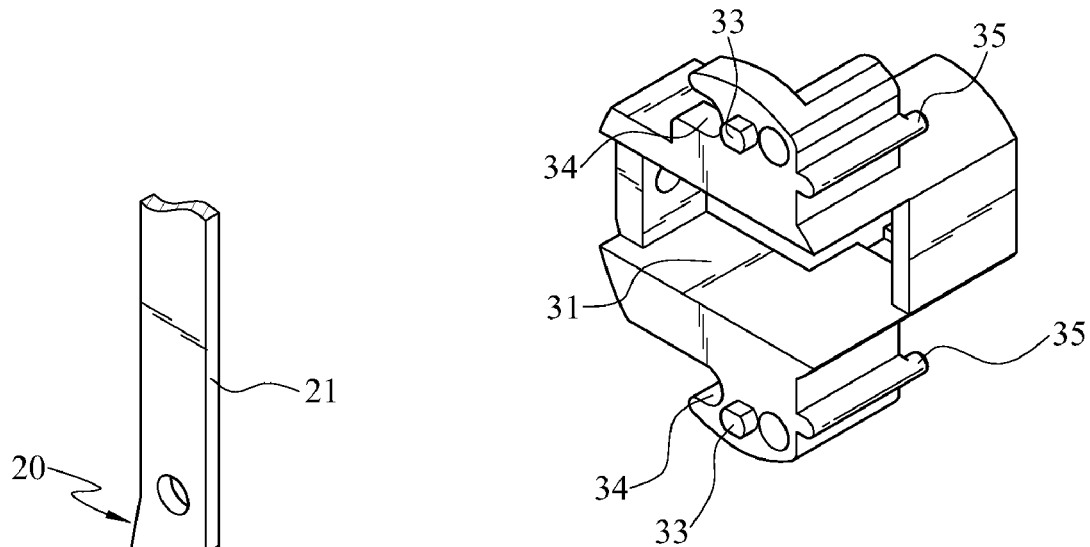
FIG. 1B is a schematic three-dimensional view of a fixed seat according to an embodiment of the present invention.

Referring to FIGS. 1A and 2, the fixed seat 30 is disposed on the other side of the holding section 22 opposite to the rotating shaft 13. The fixed seat 30 and the rotating shaft 13 are located at the same axle center on the holding section 22. The fixed seat 30 has an accommodation space 31, a power input connector 32, two insert blocks 33, two locking portions 34, two limiting posts 35, and a stopping portion 36. A groove 311 is respectively disposed on two sides of the accommodation space 31 of the fixed seat 30, and a bump 321 corresponding to the groove 311 is respectively disposed on two sides of the power input connector 32. Therefore, the power input connector 32 is accommodated and fixed in the accommodation space 31 by embedding the bumps 321 in the grooves 311. The insert blocks 33 are disposed on one side of the fixed seat 30 opposite to the holding section 22 (as shown in FIG. 1B), and they are respectively corresponding to the through-holes 222 of the holding section 22. When the fixed seat 30 is mounted on the holding section 22, the insert blocks 33 are embedded in the through-holes 222. The two locking portions 34 are respectively disposed on two sides of the fixed seat 30 corresponding to the threaded holes 221 of the holding section 22. When the fixed seat 30 is mounted on the holding section 22, fasteners 50 (for example, screws or fixing bolts) respectively penetrate through the locking portions 34 and are retained in the threaded holes 221, so as to fix the fixed seat 30 to the holding section 22. The limiting posts 35 are disposed below the locking portions 34, and the stopping portion 36 is disposed on the other end of the fixed seat 30 opposite to the limiting posts 35.

Referring to FIGS. 1A and 2, the circuit board 40 is electrically disposed with a plurality of light-emitting diodes (LEDs) 41, and has two positioning holes 42 and a port 43. The positioning holes 42 are respectively disposed on two sides of the port 43 corresponding to the limiting posts 35 of the fixed seat 30. When the circuit board 40 is fit on the fixed seat 30 through the port 43, and secured to the fixed seat 30 by the fasteners 50, one end of the circuit board 40 rests against the stopping portion 36, and the limiting posts 35 of the fixed seat 30 respectively penetrate through the positioning holes 42 of the circuit board 40.

Figure 3:
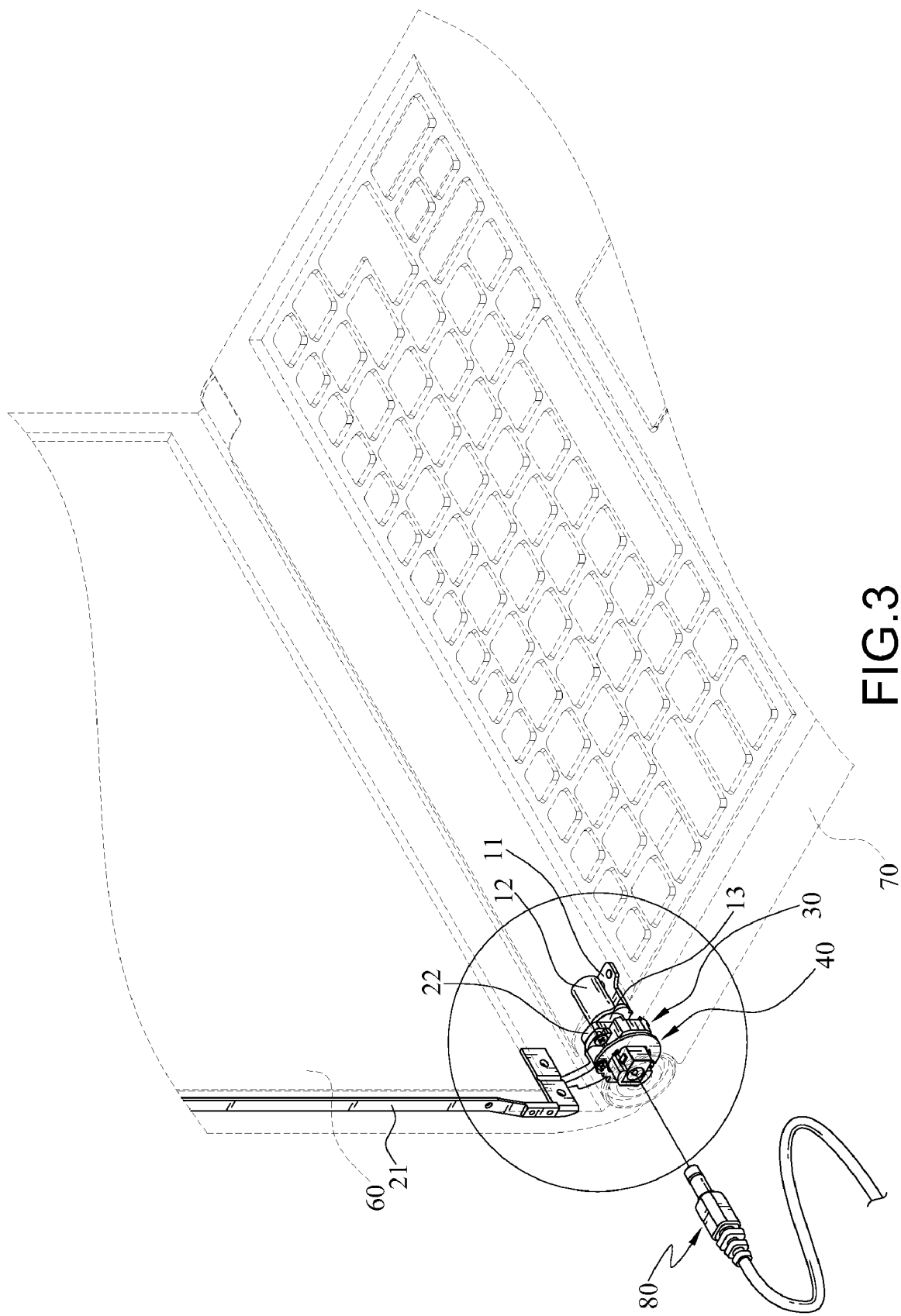
FIG. 3 is a schematic view showing an application of an embodiment of the present invention.
Figure 4:
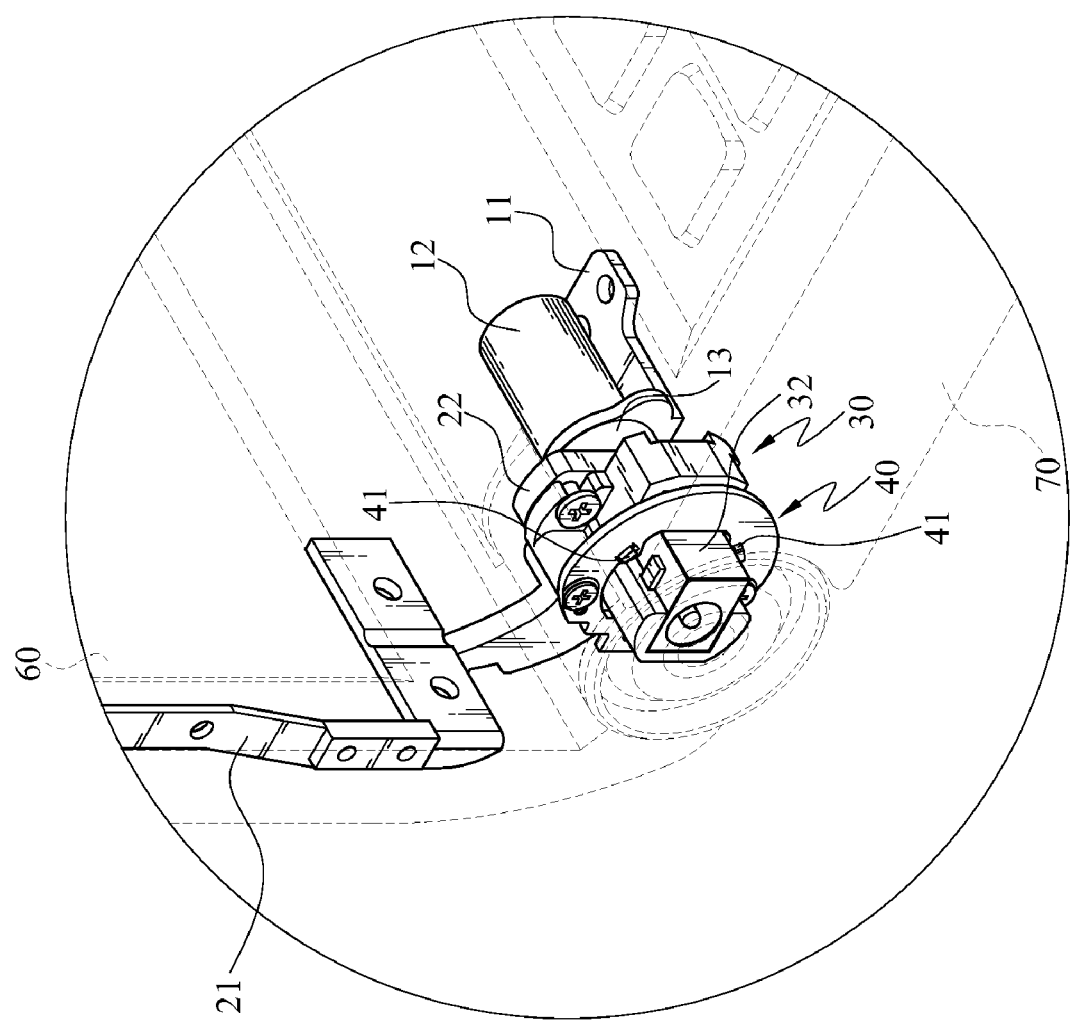
FIG. 4 is a schematic partially enlarged view of an embodiment of the present invention.

Referring to FIGS. 3 and 4, the hinge structure with an electrical connector of the present invention is applied to a notebook computer. The notebook computer includes a first body 60 (for example, a display) and a second body 70 (for example, a main body). The hinge structure of the present invention is disposed between the first body 60 and the second body 70, and is fixed to the second body 70 through the connecting piece 11 of the pivot portion 10. The upright section 21 of the support frame 20 is fixed to the first body 60, so that the first body 60 is connected to the second body 70. The holding section 22 of the support frame 20 is fit and clipped on the rotating shaft 13 of the pivot portion 10, so as to rotate relative to the pivot portion 10 through the rotating shaft 13. Therefore, when the support frame 20 rotates relative to the pivot portion 10 through the rotating shaft 13, the support frame 20 drives the first body 60 together to rotate relative to the second body 70.

The power input connector 32 is accommodated in the accommodation space 31 of the fixed seat 30, and the fixed seat 30 and the rotating shaft 13 are located at the same axle center position. Thus, the power input connector 32 is also located at the axle center position of the hinge structure. When a power line 80 is to be connected in the notebook computer, as long as the hinge position of the notebook computer is confirmed, the power line 80 can be immediately inserted in the power input connector 32 smoothly, without wasting time in searching for the position of the power connector on the second body 70.

Moreover, as the power input connector 32 on the fixed seat 30 and the circuit board 40 are electrically connected to a power module (not shown) in the notebook computer, when a power line 80 is accurately inserted in the power input connector 32 of the fixed seat 30 to provide a power required for the operation of the notebook computer, the LEDs 41 on the circuit board 40 are turned on. Therefore, the user can easily figure out whether the power line is accurately inserted in the power input connector 32 or not, so that the hinge structure with an electrical connector of the present invention is enabled to show the plugging or pulling status of the power line.

In addition to the above operating mode that the LEDs are turned on after the power line is inserted in the power input connector, the LEDs may also be turned on upon being powered by a battery inside the notebook computer. After being turned on, the LEDs may emit light continuously or intermittently (for example, flashing once every five seconds), for indicating the position of the electrical connector on the notebook computer. Therefore, when the notebook computer is disposed at a dark place or a place with faint light, the user can easily find the notebook computer by following the light emitted from the notebook computer or insert the power line in the electrical connector successfully. In addition, the detailed structures and actuation modes of the LEDs are not technical features of the present invention, which thus will not be described herein again.

In view of the above, the hinge structure with an electrical connector of the present invention is adapted to connect a first body to a second body of an electronic device, so that the first body is capable of rotating relative to the second body. Meanwhile, a power input connector of the notebook computer is disposed on the hinge structure, such that the user can insert a power line in the notebook computer without wasting time in searching for the position of the power input connector on the notebook computer. Moreover, at least one LED is disposed in the present invention, which is turned on to show the plugging or pulling status of the power line, and thus the user can easily figure out whether the power line is successfully plugged or pulled.

What is claimed is:

1. A hinge structure with an electrical connector, adapted to connect a first body to a second body of an electronic device, such that the first body is capable of rotating relative to the second body, wherein the electrical connector is a power input connector, and a power line is inserted in the power input connector to electrically connect to the electronic device, the hinge structure comprising:

a pivot portion, disposed on the second body, and having a rotating shaft;

a support frame, having an upright section and a holding section, wherein the upright section is disposed on the first body, and the holding section is connected to the rotating shaft, so as to rotate relative to the second body through the rotating shaft; and a fixed seat, disposed on the other side of the holding section opposite to the pivot portion, and having an accommodation space for accommodating the power input connector;

wherein the electrical connector, the rotating shaft, and the fixed seat are located at the same axle center position on the holding section.

2. The hinge structure with an electrical connector according to claim 1, wherein the rotating shaft has a retaining portion, the holding section has an opening matching with the retaining portion, and the retaining portion is clipped in the opening, such that the rotating shaft drives the support frame to rotate relative to the second body.

3. The hinge structure with an electrical connector according to claim 1, wherein the pivot portion further has a connecting piece, and the pivot portion is fixed to the second body through the connecting piece.

4. The hinge structure with an electrical connector according to claim 1, wherein the accommodation space of the fixed seat has a groove, the power input connector has a bump matching with the groove, and the power input connector is fixed in the accommodation space through embedding the bump into the groove.

5. The hinge structure with an electrical connector according to claim 1, wherein the fixed seat further has at least one insert block, the holding section further has at least one through-hole, and the insert block is embedded in the through-hole when the fixed seat is disposed at the holding section.

6. The hinge structure with an electrical connector according to claim 1, further comprising a circuit board, wherein the circuit board is disposed on the fixed seat, and has at least one light-emitting diode (LED).

7. The hinge structure with an electrical connector according to claim 6, wherein the fixed seat further has a stopping portion, and the circuit board is disposed on the fixed seat and rests against the stopping portion.

8. The hinge structure with an electrical connector according to claim 6, wherein the fixed seat has at least one limiting post, the circuit board has at least one positioning hole, and the limiting post penetrates through the positioning hole when the circuit board is fixed to the fixed seat.

9. A hinge structure with an electrical connector, adapted to connect a first body to a second body of an electronic device, such that the first body is capable of rotating relative to the second body, wherein the electrical connector is a power input connector, and a power line is inserted in the power input connector to electrically connect to the electronic device, the hinge structure comprising:
- a pivot portion, disposed on the second body, and having a rotating shaft;
- a support frame, having an upright section and a holding section, wherein the upright section is disposed on the first body, and the holding section is connected to the rotating shaft, so as to rotate relative to the second body through the rotating shaft; and
- a fixed seat, disposed on the other side of the holding section opposite to the pivot portion, and having an accommodation space for accommodating the power input connector,
- wherein the fixed seat further has at least one insert block, the holding section further has at least one through-hole, and the insert block is embedded in the through-hole when the fixed seat is disposed at the holding section.

10. The hinge structure with an electrical connector according to claim 9, wherein the fixed seat and the rotating shaft are located at the same axle center on the support frame.

11. The hinge structure with an electrical connector according to claim 9, wherein the rotating shaft has a retaining portion, the holding section has an opening matching with the retaining portion, and the retaining portion is clipped in the opening, such that the rotating shaft drives the support frame to rotate relative to the second body.

12. The hinge structure with an electrical connector according to claim 9, wherein the pivot portion further has a connecting piece, and the pivot portion is fixed to the second body through the connecting piece.

13. The hinge structure with an electrical connector according to claim 9, wherein the accommodation space of the fixed seat has a groove, the power input connector has a bump matching with the groove, and the power input connector is fixed in the accommodation space through embedding the bump into the groove.

14. A hinge structure with an electrical connector, adapted to connect a first body to a second body of an electronic device, such that the first body is capable of rotating relative to the second body, wherein the electrical connector is a power input connector, and a power line is inserted in the power input connector to electrically connect to the electronic device, the hinge structure comprising:
- a pivot portion, disposed on the second body, and having a rotating shaft;
- a support frame, having an upright section and a holding section, wherein the upright section is disposed on the first body, and the holding section is connected to the rotating shaft, so as to rotate relative to the second body through the rotating shaft;
- a fixed seat, disposed on the other side of the holding section opposite to the pivot portion, and having an accommodation space for accommodating the power input connector; and
- a circuit board, disposed on the fixed seat, and has at least one light-emitting diode (LED) and at least one positioning hole,
- wherein the fixed seat further has at least one limiting post penetrates through the positioning hole when the circuit board is fixed to the fixed seat.

15. The hinge structure with an electrical connector according to claim 14, wherein the fixed seat and the rotating shaft are located at the same axle center on the support frame.

16. The hinge structure with an electrical connector according to claim 14, wherein the rotating shaft has a retaining portion, the holding section has an opening matching with the retaining portion, and the retaining portion is clipped in the opening, such that the rotating shaft drives the support frame to rotate relative to the second body.

17. The hinge structure with an electrical connector according to claim 14, wherein the pivot portion further has a connecting piece, and the pivot portion is fixed to the second body through the connecting piece.

18. The hinge structure with an electrical connector according to claim 14, wherein the accommodation space of the fixed seat has a groove, the power input connector has a bump matching with the groove, and the power input connector is fixed in the accommodation space through embedding the bump into the groove.

19. The hinge structure with an electrical connector according to claim 14, wherein the fixed seat further has at least one insert block, the holding section further has at least one through-hole, and the insert block is embedded in the through-hole when the fixed seat is disposed at the holding section.

* * * * *

UNITED STATES PATENT AND TRADEMARK OFFICE
CERTIFICATE OF CORRECTION

| | | |
|---|---|---|
| PATENT NO. | : 7,740,496 B2 | Page 1 of 1 |
| APPLICATION NO. | : 12/396709 | |
| DATED | : June 22, 2010 | |
| INVENTOR(S) | : Yi-Hsun Hung et al. | |

It is certified that error appears in the above-identified patent and that said Letters Patent is hereby corrected as shown below:

Title Page; item (73);

"Inventec Corporat" should read -- Inventec Corporation --.

Signed and Sealed this
Twenty-eighth Day of December, 2010

David J. Kappos
*Director of the United States Patent and Trademark Office*